United States Patent
Wakasugi

(10) Patent No.: US 12,499,190 B2
(45) Date of Patent: Dec. 16, 2025

(54) INFORMATION PROCESSING DEVICE AND INFORMATION PROCESSING PROGRAM

(71) Applicant: FUJIFILM CORPORATION, Tokyo (JP)

(72) Inventor: Kosuke Wakasugi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 264 days.

(21) Appl. No.: 18/262,377

(22) PCT Filed: Feb. 2, 2022

(86) PCT No.: PCT/JP2022/004126
§ 371 (c)(1),
(2) Date: Jul. 21, 2023

(87) PCT Pub. No.: WO2022/176625
PCT Pub. Date: Aug. 25, 2022

(65) Prior Publication Data
US 2024/0078298 A1    Mar. 7, 2024

(30) Foreign Application Priority Data
Feb. 17, 2021 (JP) .................... 2021-023748

(51) Int. Cl.
*G06F 21/31* (2013.01)
(52) U.S. Cl.
CPC .................... *G06F 21/31* (2013.01)
(58) Field of Classification Search
CPC .... G06F 21/31; G06F 21/608; G06F 3/04886; G06F 21/6245; G06F 21/84; G06F 3/0482
See application file for complete search history.

(56) References Cited

U.S. PATENT DOCUMENTS

2003/0105643 A1\* 6/2003 Chen ................. H04L 61/5084
358/1.15
2004/0122730 A1\* 6/2004 Tucciarone ......... H04L 12/1859
705/14.66

(Continued)

FOREIGN PATENT DOCUMENTS

EP          2843584 A1    3/2015
JP       2010-201931 A    9/2010

(Continued)

OTHER PUBLICATIONS

English language translation of the following: Office action dated Jul. 30, 2024 from the JPO in a Japanese patent application No. 2021-023748 corresponding to the instant patent application. This office action translation is submitted now in order to supplement the understanding of the cited references which are being disclosed in the instant Information Disclosure Statement.

*Primary Examiner* — James R Turchen
(74) *Attorney, Agent, or Firm* — SOLARIS Intellectual Property Group, PLLC

(57) ABSTRACT

This information processing device comprises a processor. The processor receives a setting of a job that is processing for the device to execute a function. When the job has been executed using the received setting, if an operation is being performed continuously by an unauthenticated user that is a user who is not authenticated, the processor causes an operator associated with the setting of the job that has been executed to be displayed on a display unit. If an operation is not being performed continuously by the unauthenticated user, the processor hides the operator.

8 Claims, 8 Drawing Sheets

(56) References Cited

U.S. PATENT DOCUMENTS

| | | |
|---|---|---|
| 2012/0192257 A1 | 7/2012 | Ishii |
| 2013/0044352 A1* | 2/2013 | Han ............... H04N 1/4406 |
| | | 358/1.15 |
| 2015/0062615 A1 | 3/2015 | Furutani et al. |
| 2016/0006887 A1 | 1/2016 | Takenaka |
| 2018/0300463 A1* | 10/2018 | Takeo ............... G06F 3/1238 |
| 2020/0301639 A1* | 9/2020 | Ren ................ G06F 3/1271 |
| 2021/0136252 A1* | 5/2021 | Fukuda ........... H04N 1/32106 |
| 2023/0409259 A1* | 12/2023 | Hirano ............. G06F 3/1267 |

FOREIGN PATENT DOCUMENTS

| | | |
|---|---|---|
| JP | 2012-155512 A | 8/2012 |
| JP | 2015-50611 A | 3/2015 |
| JP | 2016-19051 A | 2/2016 |
| JP | 2017-027313 A | 2/2017 |
| JP | 2017-200219 A | 11/2017 |
| JP | 2018-182519 A | 11/2018 |

* cited by examiner

FIG.3

| PRIORITY | CONDITION | PROPRIETY | | | | |
|---|---|---|---|---|---|---|
| 1 | (CONDITION 1) MATERIAL REMAINS IN INFORMATION PROCESSING DEVICE | ○ | × | × | × | × |
| 2 | (CONDITION 2) USER IS NOT AWAY FROM INFORMATION PROCESSING DEVICE | – | ○ | ○ | × | × |
| | (CONDITION 3) OPERATION IS PERFORMED WITHIN PREDETERMINED PERIOD | – | ○ | × | ○ | × |
| DETERMINATION | | CONTINUED | CONTINUED | COMPLETED | COMPLETED | COMPLETED |

INFORMATION PROCESSING DEVICE AND INFORMATION PROCESSING PROGRAM

TECHNICAL FIELD

The technology of the present disclosure relates to an information processing device and an information processing program.

BACKGROUND ART

Japanese Patent Application Laid-Open (JP-A) No. 2010-201931 discloses a technology including setting means for performing settings for executing a job; execution means for executing one job according to the settings performed for the one job by the setting means; storage means for storing the settings performed for the one job executed by the execution means as one setting history and storing a plurality of the setting histories for respective jobs; authentication means for authenticating an operator; display control means for displaying, on a display unit, a setting history corresponding to the operator authenticated by the authentication means among the plurality of setting histories stored in the storage means; and control means for executing a job using the setting history in a case in which an execution request for the job using the setting history displayed on the display unit is input.

SUMMARY OF INVENTION

Technical Problem

In an own device (for example, a multifunction peripheral) used by an unspecified number of users, an operation of setting a job, which is a process of executing a function of the own device, by a user who is not authenticated (hereinafter, referred to as an "unauthenticated user") may be complicated. Thus, there is a technology in which, in a case in which a job is executed, settings of the executed job are stored, and the settings are presented to an unauthenticated user when the job is executed again.

However, in a case in which an unspecified number of unauthenticated users use the own device, the settings of the job executed by one unauthenticated user can be recognized by another unauthenticated user, which is not preferable in terms of security.

An object of the technology of the present disclosure is to provide an information processing device and an information processing program capable of preventing another unauthenticated user from recognizing settings of a job executed by one unauthenticated user even in a case in which an unspecified number of unauthenticated users use the information processing device.

Solution to Problem

According to a first aspect, there is provided an information processing device including a processor, in which the processor is configured to receive settings of a job that is a process in which an own device executes a function, and in a case in which the job is executed by using the received settings, display an operator associated with the settings of the executed job on a display unit in a case in which an operation is continuously performed by an unauthenticated user who is a user who is not authenticated, and does not display the operator in a case in which the operation is not continuously performed by the unauthenticated user.

According to an information processing device of a second aspect, in the information processing device of the first aspect, the processor is further configured to in a case in which setting information that is information regarding the settings includes destination information that is information regarding a destination and the job is executed by using the setting information, store the setting information, in a case in which the operator is not displayed and the destination information is input, specify the setting information related to the input destination information from the stored setting information, and display the operator associated with the settings related to the specified setting information.

According to the information processing device of a third aspect, in the information processing device of the second aspect, the processor is further configured to, in a case in which the destination information is not included in the setting information, display the operator associated with the settings of the executed job regardless of whether or not the operation is performed by the unauthenticated user.

According to the information processing device according to a fourth aspect, in the information processing device according to any one of the first aspect to the third aspect, the processor is further configured to determine that the operation is continuously performed by the unauthenticated user in a case in which at least one condition of a case in which a material used to execute the job remains in the own device, a case in which the unauthenticated user is not away from the own device, or a case in which the operation is performed within a predetermined period is satisfied.

According to an information processing device of a fifth aspect, in the information processing device of the fourth aspect, the processor is further configured to preset priorities for respective conditions of a case in which a material used to execute the job remains in the own device, a case in which the unauthenticated user is not away from the own device, and a case in which an operation is performed within a predetermined period, and determine whether or not an operation is continued by the unauthenticated user according to propriety of a condition with a high priority.

According to an information processing device of a sixth aspect, in the information processing device of any one of the first aspect to the fifth aspect, the processor is further configured to, in a case in which it is determined that the operation is not continuously performed by the unauthenticated user, notify that the operator is not displayed.

According to an information processing device of a seventh aspect, in the information processing device of any one of the first to sixth aspects, the processor is further configured to, in a case in which the operator is selected, apply the settings associated with the operator to the job and receive an instruction to immediately execute the job or an instruction to change the settings applied to the job.

According to an eighth aspect, there is provided an information processing program causing a computer to execute receiving settings of a job that is a process in which an own device executes a function; and in a case in which the job is executed by using the received settings, displaying an operator associated with the settings of the executed job on a display unit in a case in which an operation is continuously performed by an unauthenticated user who is a user who is not authenticated, and not displaying the operator in a case in which the operation is not continuously performed by the unauthenticated user.

Advantageous Effects of Invention

According to the information processing device of the first aspect and the information processing program of the eighth aspect, even in a case in which an unspecified number of unauthenticated users use the information processing device, it is possible to prevent another unauthenticated user from recognizing settings of a job executed by one unauthenticated user.

According to the information processing device of the second aspect, it is possible to present settings of a job that was executed in the past and is no longer displayed again.

According to the information processing device of the third aspect, in a job related to setting information not including destination information, it is possible to reduce a user's time and effort compared with a case in which destination information is input and settings of a job are displayed again.

According to the information processing device of the fourth aspect, it is possible to determine whether or not an operation is continuously performed.

According to the information processing device of the fifth aspect, it is possible to determine whether or not an operation is continuously performed in consideration of the degree of importance of a condition and a combination of conditions.

According to the information processing device of the sixth aspect, it is possible to recognize that a job is set to non-display.

According to the information processing device of the seventh aspect, it is possible to allow a user to select whether to immediately execute a job or change settings.

BRIEF DESCRIPTION OF DRAWINGS

FIG. 3 is a diagram illustrating an example of a priority of each condition according to the present embodiment.

DESCRIPTION OF EMBODIMENTS

Hereinafter, exemplary embodiments for carrying out the technology of the present disclosure will be described in detail with reference to the drawings.

Figure 1:
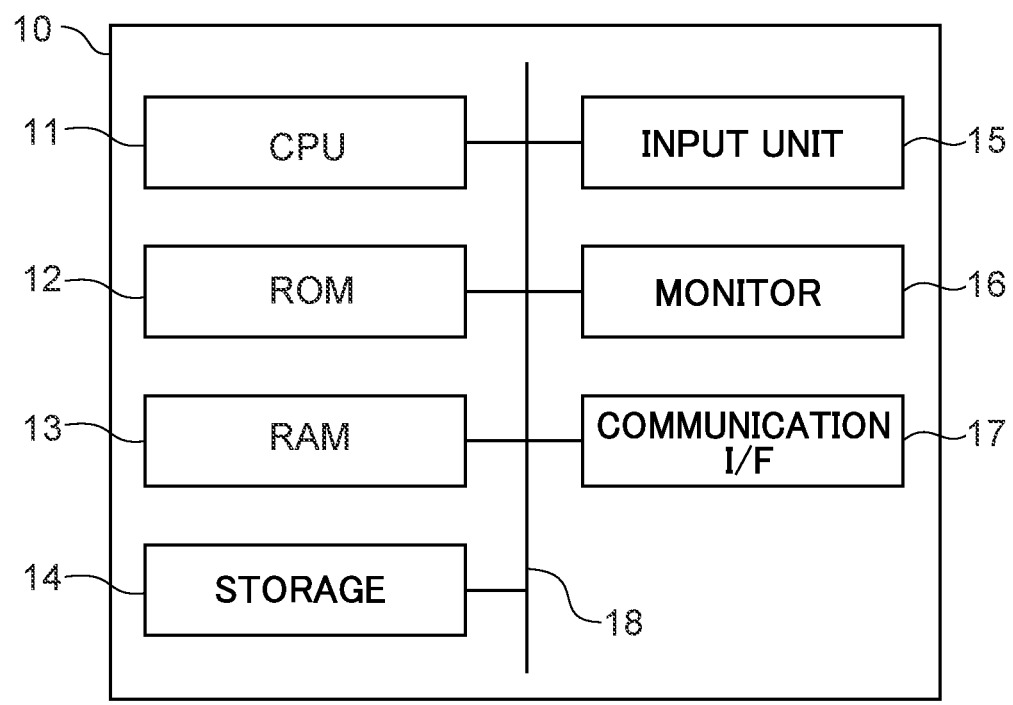
FIG. 1 is a block diagram illustrating an example of a hardware configuration of an information processing device according to the present embodiment.

First, a configuration of an information processing device 10 will be described with reference to FIG. 1. FIG. 1 is a block diagram illustrating an example of a hardware configuration of the information processing device 10 according to the present embodiment. As an example, a mode in which the information processing device 10 according to the present embodiment is mounted on an image forming apparatus such as a multifunction peripheral will be described. However, the present invention is not limited thereto. The information processing device 10 may be a terminal such as a personal computer or a server.

As illustrated in FIG. 1, the information processing device 10 according to the present embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication OF 17 are connected to each other via a bus 18. Here, the CPU 11 is an example of a processor.

The CPU 11 integrally controls the entire information processing device 10. The ROM 12 stores various programs including an information processing program used in the present embodiment, data, and the like. The RAM 13 is a memory used as a work area when various programs are executed. The CPU 11 performs a process of displaying each screen by loading a program stored in the ROM 12 to the RAM 13 and executing the program. The storage 14 is, for example, a hard disk drive (HDD), a solid state drive (SSD), or a flash memory. The storage 14 may store the information processing program or the like. The input unit 15 is a touch panel, a mouse, a keyboard, or the like that receives character input, a user's instruction, or the like. The monitor 16 displays each screen. A touch panel, which is an example of the input unit 15, is attached to the monitor 16 in an overlapping manner, and in a case in which an operator displayed at a location where the touch panel is pressed is operated by the user, the CPU 11 is notified of an instruction associated with the operated operator. The communication I/F 17 transmits and receives data.

Figure 2:
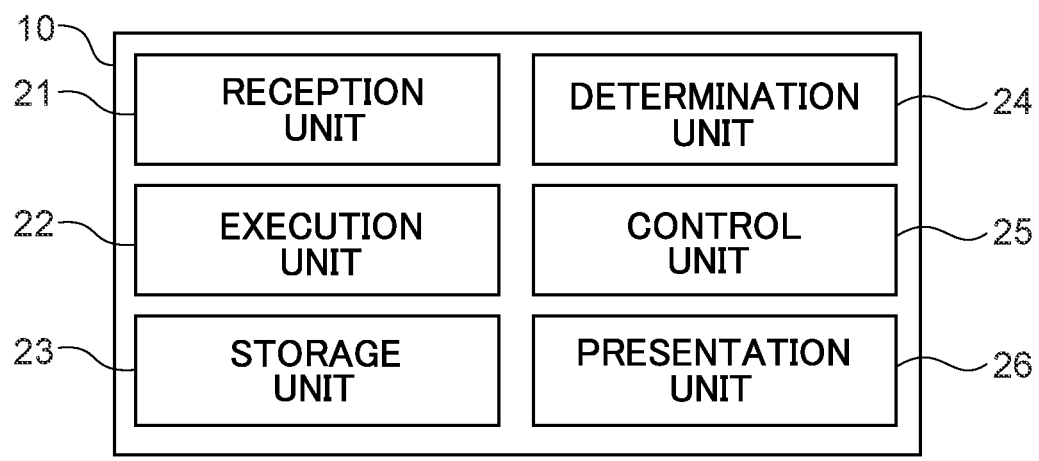
FIG. 2 is a block diagram illustrating an example of a functional configuration of the information processing device according to the present embodiment.

Next, a functional configuration of the information processing device 10 will be described with reference to FIG. 2. FIG. 2 is a block diagram illustrating an example of a functional configuration of the information processing device 10 according to the present embodiment.

As illustrated in FIG. 2, the information processing device 10 includes a reception unit 21, an execution unit 22, a storage unit 23, a determination unit 24, a control unit 25, and a presentation unit 26. The CPU 21 executes the information processing program to function as the reception unit 21, the execution unit 22, the storage unit 23, the determination unit 24, the control unit 25, and the presentation unit 26.

The reception unit 21 receives, from a user, settings for a process (hereinafter, referred to as a "job") in which the information processing device 10 executes a function and a job execution instruction. The reception unit 21 receives information regarding a destination (hereinafter, referred to as "destination information") related to a transmission destination input by a user. Here, the functions according to the present embodiment include, for example, a copy function of duplicating a material in a multifunction peripheral, a scan function of reading a material as electronic data, and a facsimile (FAX) function of transmitting a material. The reception unit 21 receives, in each function, information related to a setting (hereinafter, referred to as "setting information") related to an input job. The setting information according to the present embodiment is information such as destination information regarding destinations of scan and FAX transmission destinations, a setting of a capture surface of a material, a color setting, a password, and the number of copies. A user according to the present embodiment is an unspecified user who is not authenticated, and the user is an example of an "unauthenticated user". The destination information according to the present embodiment is, for example, information regarding a destination such as a mail address, a FAX number, and an IP address to which data is transmitted.

The execution unit 22 executes a job by applying the setting information received by the reception unit 21.

The storage unit 23 stores the setting information of the job executed by the execution unit 22.

The determination unit 24 determines whether or not an operation is continuously performed by the user. The determination unit 24 determines that an operation is continuously performed in a case in which at least one of a case in which a material used to execute the job remains in the information processing device 10, a case in which the user is not away from the information processing device 10, or a case in which the operation is performed within a predetermined period is satisfied. A sensor (not illustrated) is used to detect that the material remains in the information processing device 10 and that the user has moved away from the information processing device 10. The case in which the operation is performed within a predetermined period is detected on the basis of whether or not the predetermined time has elapsed from the time at which the operation was last input to the information processing device 10. Hereinafter, the case in which a material remains in the information processing device 10 will be described as a "condition 1", the case in which a user is not away from the information processing device 10 will be described as a "condition 2", and the case in which an operation is performed within a predetermined period of time is satisfied will be described as a "condition 3".

In the present embodiment, for each of the conditions 1 to 3 described above, a setting as to whether or not the condition is to be used for determination may be set by the user. For example, in a case in which the condition 1 is set as a condition for determination, it is determined whether an operation is continuously performed according to whether or not the condition 1 is satisfied. On the other hand, in a case in which the condition 1 is not set as a condition for determination, it is determined whether or not an operation is continuously performed according to another set condition regardless of whether or not the condition 1 is satisfied.

In a case in which a plurality of conditions among the three conditions are satisfied, it may be determined that an operation is continuously performed, or a priority may be set, and it may be determined whether an operation is continuously performed according to whether or not each condition is satisfied in the order of the priority.

For example, as illustrated in FIG. 3, priorities are set for three conditions, and it is determined whether or not an operation is continuously performed on the basis of whether or not one or a plurality of conditions are satisfied according to the priorities.

As illustrated in FIG. 3, in a case in which the condition 1 is set to the first priority and the conditions 2 and 3 are set to the second priority, first, determination is performed for the condition 1 of the first priority, and in a case in which the condition is satisfied, it is determined that an operation is continuously performed regardless of the conditions 2 and 3. In a case in which the condition 1 is not satisfied, determined is performed for the condition 2 and the condition 3 of the second priority, and in a case in which the condition 2 is satisfied and the condition 3 is satisfied, it is determined that an operation is continuously performed. In a case in which only one of the condition 2 or the condition 3 is satisfied or none of conditions 1 to 3 is satisfied, it is determined that an operation has been completed. That is, determination is performed for a set condition in an order of each set priority, and in a case in which a plurality of conditions are set to the same priority, it is determined whether or not the plurality of conditions are satisfied. A priority in each condition may be set in advance or may be set by a user. Each combination of a condition and a priority may be any combination, and any condition may be selected among conditions.

The control unit 25 performs display or non-display control on setting information related to a job. Specifically, in a case in which the setting information is stored in the storage unit 23, the control unit 25 sets a display setting to "display" with respect to the setting information. In a case in which the determination unit 24 determines that an operation has been completed, the control unit 25 sets the display setting to "non-display" with respect to the setting information of which "display" is set in the display setting. In a case in which destination information is received by the reception unit 21, the control unit 25 sets "display" in the display setting with respect to setting information including the received destination information among the pieces of setting information stored in the storage unit 23.

The presentation unit 26 displays setting information related to jobs executed in the past as a history. Specifically, presentation unit 26 displays, as a history, an icon associated with setting information in which a display setting is set to "display" on a history display screen 50 that will be described later. In a case in which the icon is selected by a user, the presentation unit 26 displays the setting information associated with the icon.

In a case in which the determination unit 24 determines that an operation has been completed, the presentation unit 26 displays and notifies that the history is not displayed. Here, in a case in which the determination unit 24 determines that the operation has been completed, "non-display" is set in the display setting of the setting information by the control unit 25, and the presentation unit 26 does not display the operator. In the present embodiment, a mode of displaying that a history is not displayed has been described. However, the present invention is not limited thereto. The notification may be provided by using voice.

In a case in which the reception unit 21 receives the destination information, the control unit 25 sets "display" in the display setting of the setting information including the received destination information, and the presentation unit 26 displays, as a history, the setting information of which "display" is set in the display setting on the history display screen 50 that will be described later.

Figure 4:
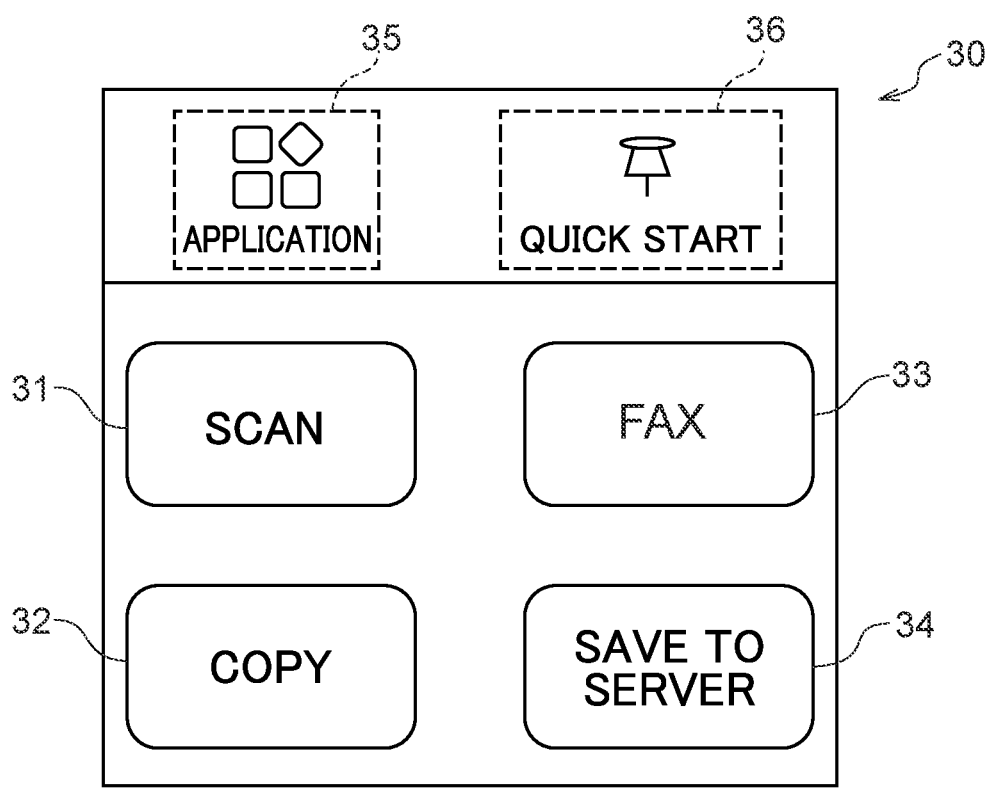
FIG. 4 is a front view illustrating an example of a function selection screen related to a job according to the present embodiment.

Next, before describing an operation of the information processing device 10, each screen according to the present embodiment will be described with reference to FIGS. 4 to 7. First, the job-related function selection screen 30 will be described with reference to FIG. 4. FIG. 4 is a front view illustrating an example of a function selection screen 30 related to a job according to the present embodiment.

As illustrated in FIG. 4 as an example, the function selection screen 30 includes a scan icon 31, a copy icon 32, a FAX icon 33, a server save icon 34, an application icon 35, and a quick-start icon 36.

Figure 5:
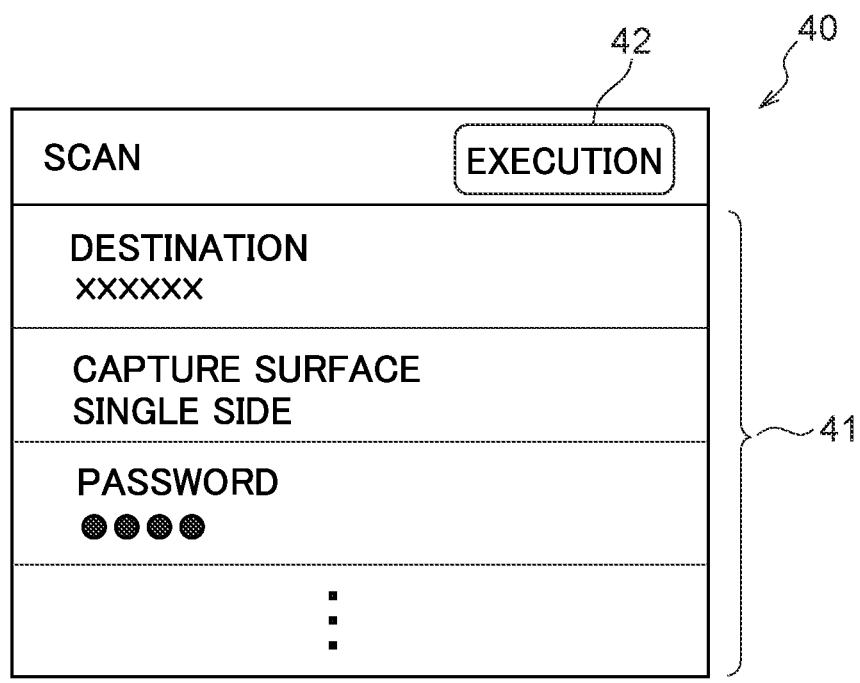
FIG. 5 is a front view illustrating an example of an input screen provided for describing job setting according to the present embodiment.

The scan icon 31, the copy icon 32, the FAX icon 33, and the server save icon 34 illustrated in FIG. 4 are icons for transmitting instructions for displaying input screens related to the respective functions in a case in which the icons are selected. For example, in a case in which the scan icon 31 is selected, an input screen 40 related to the scan function illustrated in FIG. 5 is displayed as an example. As illustrated in FIG. 5, the input screen 40 includes a setting input region 41 and an execution icon 42. The setting input region 41 receives input of setting information regarding a job related to each function, and the execution icon 42 receives an instruction to execute the job related to each function by using the input setting information.

Figure 6:
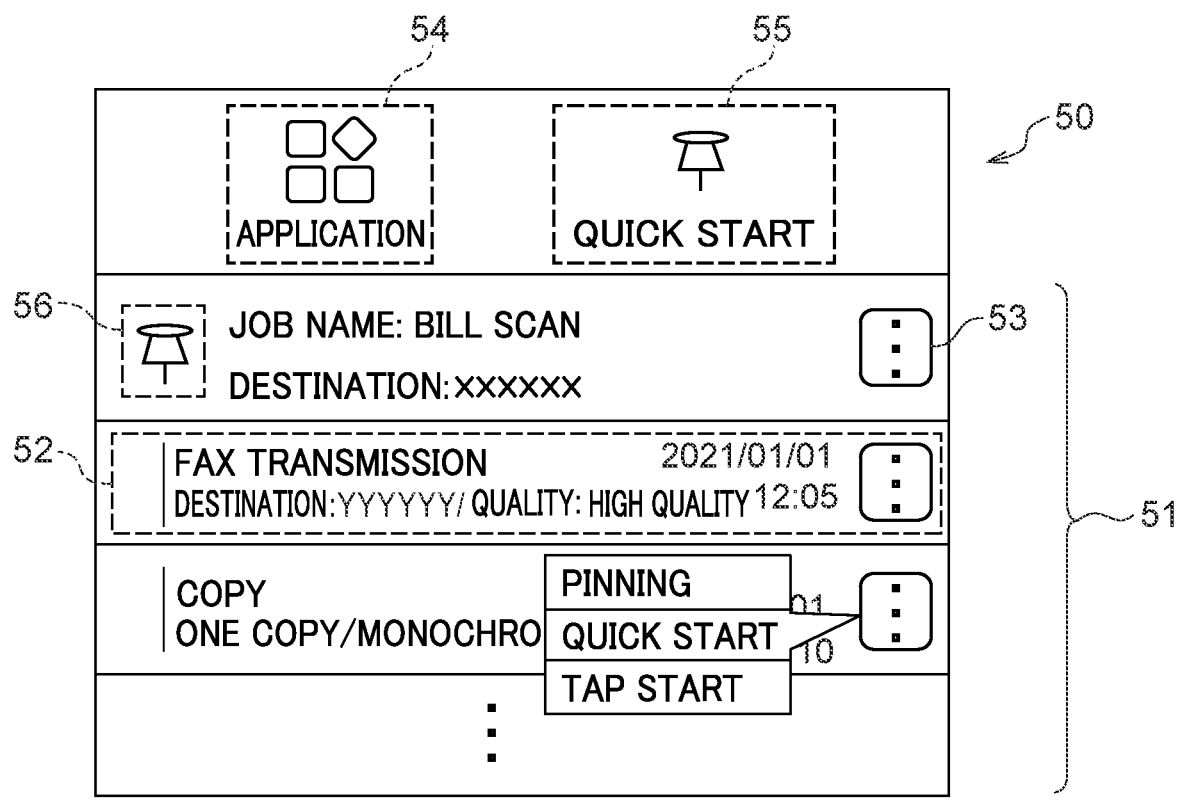
FIG. 6 is a front view illustrating an example of a history screen provided for describing display of a history according to the present embodiment.

In a case in which the application icon 35 illustrated in FIG. 4 is selected, the function selection screen 30 for selecting each function is displayed, and in a case in which the quick-start icon 36 is selected, a history display screen 50 illustrated in FIG. 6 is displayed as a screen for displaying a history of executed jobs. In a case in which the function selection screen illustrated in FIG. 4 is being displayed, the application icon 35 is displayed in a highlighted and inactive state as a selected state.

As an example, the history display screen 50 illustrated in FIG. 6 includes a history display region 51, a history icon 52, an operation icon 53, an application icon 54, and a quick-start icon 55.

The history display region 51 displays the history icon 52 associated with setting information of an executed job. For example, in a case in which an operation is continuously performed, the history icon 52 as a history of jobs executed by a user is displayed in the history display region 51, and in a case in which the operation has been completed, the history icon 52 is not displayed. In a case in which a history is not displayed, a destination information input form (not illustrated) is displayed on the history display screen 50, and in a case in which destination information is input, setting information including the input destination information is searched for and specified, and the history icon 52 related to the corresponding setting information is displayed. In other words, the history icon 52 is not displayed on the history display screen 50 in a case in which it is determined that the operation has been completed. In a case in which input of destination information is received and the destination information is input after the history icon 52 is not displayed, the history icon 52 related to setting information including the input destination information is displayed on the history display screen 50 again. A history related to the copy function not including destination information may be continuously displayed instead of non-display regardless of the presence or absence of a user's operation even after it is determined that an operation has been completed. Here, the history icon 52 according to the present embodiment is an example of an "operator".

In a case in which the operation icon 53 is selected, an option for executing a job related to the selected history icon 52 is displayed. For example, as illustrated in FIG. 6, balloons such as "pinning", "quick start", and "tap start" are displayed for the selected history icon 52. The pinning according to the present embodiment is an instruction to save the history icon 52. The history icons 52 according to the present embodiment are displayed in the history display region 51 by a predetermined number in an execution order, and in a case in which the execution order of the history icons 52 exceeds a predetermined number, the history icons 52 are not displayed. Therefore, even in a case in which the execution order of the history icons 52 exceeds the predetermined number, the history icon 52 in which the pinning is set and saved is continuously displayed in the history display region 51. A pinning mark 56 indicating that pinning is set is displayed on the history icon 52 in which the pinning is set, and the date and time at which a job was executed is displayed on the normal history icon 52 in which the pinning is not set.

The quick start according to the present embodiment is an instruction to immediately re-execute a selected job. For example, in a case in which the quick start is selected, the same setting information as setting information at the time of execution of a job related to the selected history icon 52 is applied to the job, and a function related to the job is immediately executed. The tap start according to the present embodiment is an instruction to receive a change of setting information of a selected job. For example, in a case in which the tap start is selected, setting information of a selected job is applied and displayed on the input screen 40 for a function of the job related to the selected history icon 52, a change of the setting information is received and an instruction to execute the job is received.

In a case in which the application icon 54 is selected, the function selection screen 30 illustrated in FIG. 4 is displayed as a screen for selecting each function, and in a case in which the quick-start icon 55 is selected, the history display screen 50 is displayed as a screen for displaying a history of executed jobs. In a case in which the history display screen 50 illustrated in FIG. 6 is being displayed, the quick-start icon 55 is in a highlighted and inactive state as a selected state.

Figure 7:
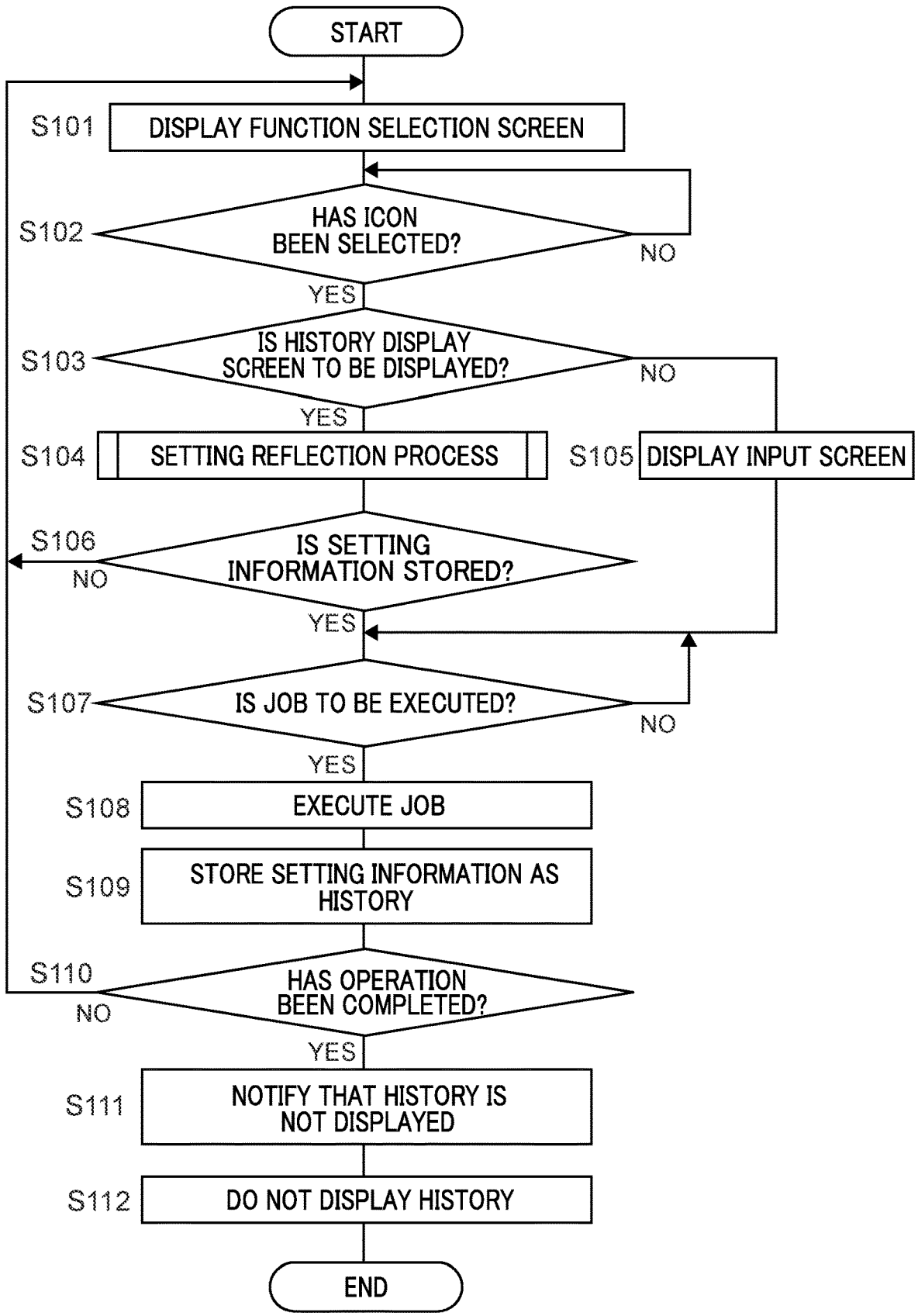
FIG. 7 is a flowchart illustrating an example of a flow of a job execution process according to the present embodiment.
Figure 8:
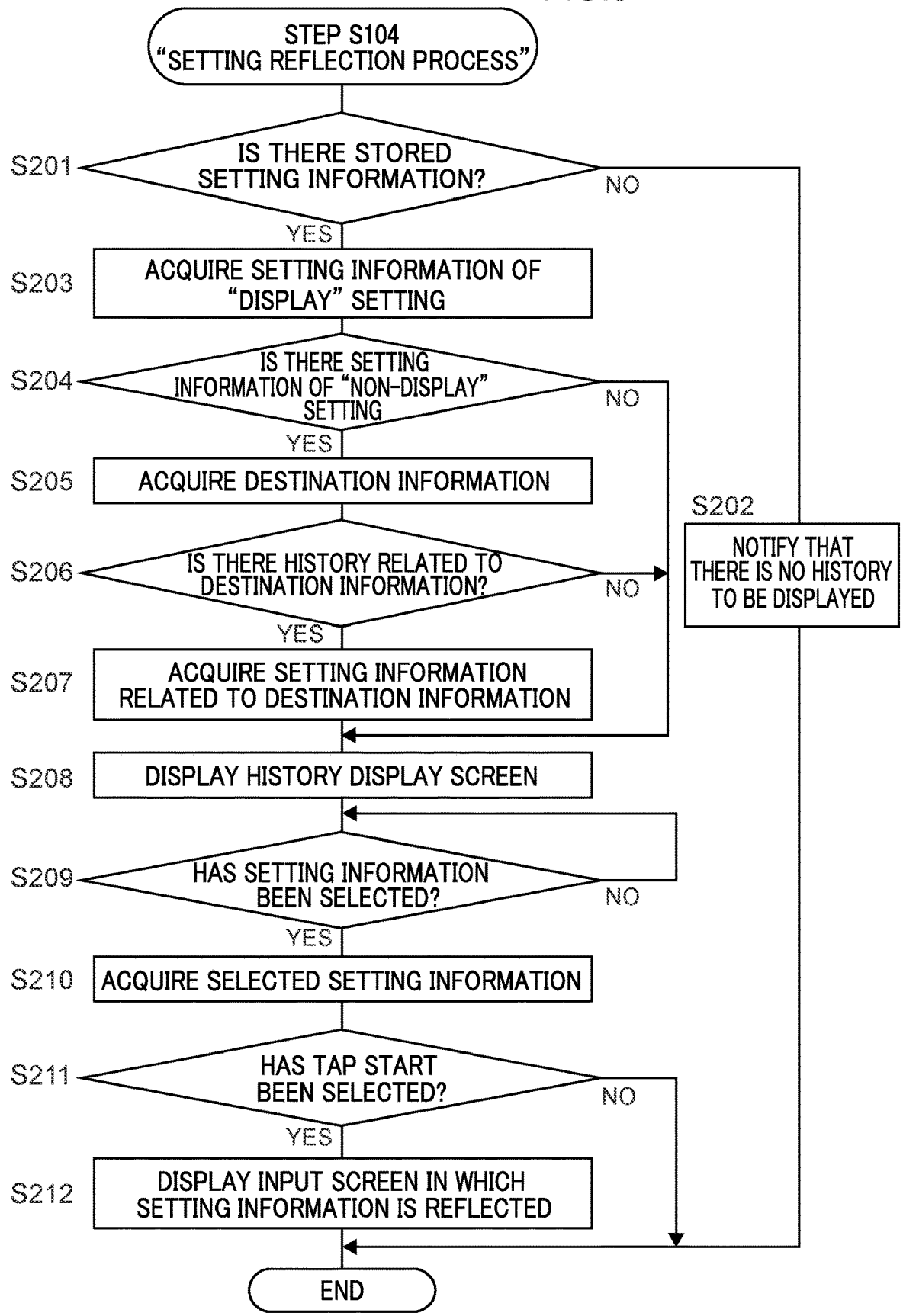
FIG. 8 is a flowchart illustrating an example of a flow of a setting reflection process according to the present embodiment.

Next, an operation of the information processing device 10 according to the present embodiment will be described with reference to FIGS. 7 and 8. FIG. 7 is a flowchart illustrating an example of job execution process according to the present embodiment. The CPU 11 reads and executes the information processing program from the ROM 12 or the storage 14, and thus the information processing program illustrated in FIG. 7 is executed. The information processing program illustrated in FIG. 7 is executed, for example, in a case in which the information processing device 10 is started and an instruction to execute information processing is input from a user.

In step S101, the CPU 11 displays the function selection screen 30.

In step S102, the CPU 11 determines whether an icon has been selected. In a case in which the icon is selected (step S102: YES), the CPU 21 proceeds to step S103. On the other hand, in a case in which no icon is selected (step S102: NO), the CPU 11 waits until an icon is selected.

In step S103, the CPU 11 determines whether or not the quick-start icon 36 is selected and the history display screen 50 is displayed. In a case in which the history display screen 50 is displayed (step S103: YES), the CPU 11 proceeds to step S104. On the other hand, in a case in which the history display screen 50 is not displayed (step S103: NO), the CPU 11 proceeds to step S105.

In step S104, the CPU 11 executes a setting reflection process. The setting reflection process will be described in detail with reference to FIG. 8 that will be described later.

In step S105, the CPU 11 displays the input screen 40 related to the selected function.

In step S106, the CPU 11 determines whether or not setting information related to the executed function is stored. In a case in which the setting information related to the executed function is stored (step S106: YES), the CPU 11 proceeds to step S107. On the other hand, in a case in which the setting information related to the executed function is not stored (step S106: NO), the CPU 11 proceeds to step S101.

In step S107, the CPU 11 determines whether or not the quick start or the execution icon 42 has been selected and the job is to be executed. In a case in which the job is to be executed (step S107: YES), the CPU 11 proceeds to step S108. On the other hand, in a case in which the job is not to be executed (step S107: NO), the CPU 11 waits until the quick start or the execution icon 42 is selected.

In step S108, the CPU 11 executes the selected job by using the setting information.

In step S109, the CPU 11 stores the setting information related to the executed job as a history. Here, "display" is set in a display setting of the stored setting information.

In step S110, the CPU 11 determines whether or not the operation performed by the user has been completed. In a case in which the operation performed by the user has been completed (step S110: YES), the CPU 11 proceeds to step S111. On the other hand, in a case in which the operation performed by the user is not completed (the operation is continuously performed) (step S110: NO), the CPU 11 proceeds to step S101 and displays the function selection screen 30.

In step S111, the CPU 11 provides a notification that the history related to the job is not displayed.

In step S112, the CPU 11 sets "non-display" in the display setting of the setting information related to the job, and does not display the history icon 52 on the history display screen 50. In a case in which destination information is not included in the setting information, "non-display" is not set in the display setting of the setting information regardless of the presence or absence of an operation performed by the user, and the history icon 52 related to the setting information is continuously displayed on history display screen 50.

Next, the setting reflection process will be described with reference to FIG. 8. FIG. 8 is a flowchart illustrating an example of the setting reflection process according to the present embodiment. The CPU 11 reads and executes a setting reflection program from the ROM 12 or the storage 14, and thus the setting reflection program illustrated in FIG. 8 is executed. The setting reflection program illustrated in FIG. 8 is executed in a case in which the quick-start icon 36 is selected.

In step S201, the CPU 11 determines whether there is stored setting information. In a case in which there is stored setting information (step S201: YES), the CPU 11 proceeds to step S203. On the other hand, in a case in which there is no stored setting information (step S201: NO), the CPU 11 proceeds to step S202.

In step S202, the CPU 11 notifies that there is no history to be displayed.

In step S203, the CPU 11 acquires a history (setting information) in which "display" is set in the display setting among pieces of the stored setting information.

In step S204, the CPU 11 determines whether or not there is setting information of which "non-display" is set in the display setting among the pieces of stored setting information. In a case in which there is setting information of which "non-display" is set in the display setting (step S204: YES), the CPU 11 proceeds to step S205. On the other hand, in a case in which there is no setting information of which "non-display" is set in the display setting (step S204: NO), the CPU 11 proceeds to step S208.

In step S205, the CPU 11 receives destination information and acquires the destination information.

In step S206, the CPU 11 determines whether there is setting information related to the destination information. In a case in which there is setting information related to the destination information (step S206: YES), the CPU 11 proceeds to step S207. On the other hand, in a case in which there is no setting information related to the destination information (step S206: NO), the CPU 21 proceeds to step S208.

In step S207, the CPU 11 acquires the setting information related to the destination information from the stored setting information.

In step S208, the CPU 11 displays the history icon 52 associated with the acquired setting information on the history display screen 50.

In step S209, the CPU 11 determines whether quick start or tap start has been selected and setting information has been selected. In a case in which the setting information is selected (step S209: YES), the CPU 11 proceeds to step S210. On the other hand, in a case in which the setting information is not selected (step S209: NO), the CPU 11 waits until the setting information is selected.

In step S210, the CPU 11 acquires the selected setting information.

In step S211, the CPU 11 determines whether the tap start has been selected. In a case in which the tap start has been selected (step S211: YES), the CPU 11 proceeds to step S212. On the other hand, in a case in which the tap start is not selected (the quick start has been selected) (step S211: NO), the CPU 11 ends the setting reflection process without displaying the input screen 40.

In step S212, the CPU 21 displays the input screen 40 in which the acquired setting information is reflected.

As described above, according to the present embodiment, even in a case in which an unspecified number of unauthenticated users use the own device, it is possible to prevent another unauthenticated user from recognizing settings of a job executed by one unauthenticated user.

In the present embodiment, a mode has been described in which the history icon 52 displayed on the history display screen 50 is controlled by using the display setting of the setting information. However, the present invention is not limited thereto. Setting information related to the history icon 52 to be displayed may be stored in the RAM 13 and controlled. For example, the control unit 25 stores setting information related to a history to be displayed in the RAM 13, and displays the history related to the setting information on the history display screen 50. The control unit 25 may perform control not to display the history on the history display screen 50 by deleting the setting information from the RAM 13 with the event of not displaying the history.

In the present embodiment, a mode has been described in which the quick start or the tap start displayed by selecting the operation icon 53 related to the history on the history display screen 50 is selected and the process is executed. However, the present invention is not limited thereto. By directly selecting the history icon 52 displayed on the history display screen 50, the process in which the quick start or the tap start is regarded to be selected may be performed.

Although the technology of the present disclosure has been described by using each embodiment, the technology of the present disclosure is not limited to the scope disclosed in each embodiment. Various changes or improvements can be made to the respective embodiments without departing from the concept of the present invention, and modes to which the changes or improvements are made are also included in the technical scope of the technology of the present disclosure.

In the above embodiments, the processor refers to a processor in a broad sense, and includes, for example, a general-purpose processor (for example, CPU: Central Processing Unit) or a dedicated processor (for example, GPU: Graphics Processing Unit, ASIC: Application Specific Integrated Circuit, and FPGA: Field Programmable Gate Array, Programmable Logic Device).

The operation of the processor in each of the above embodiments may be performed not only by one processor but also by a plurality of processors present at physically separated positions in cooperation. An order of each operation of the processor is not limited to the order described in each of the above embodiments, and may be changed as appropriate.

In the present embodiment, the form in which the information processing program is installed in the storage has been described, but the present invention is not limited thereto. The information processing program according to the present embodiment may be provided in a form recorded in a computer-readable storage medium. For example, the information processing program may be provided in a form of being recorded on an optical disc such as a compact disc (CD)-ROM or a digital versatile disc (DVD)-ROM. The information processing program may be provided in a form of being recorded in a semiconductor memory such as a Universal Serial Bus (USB) memory or a memory card. The information processing program according to the present embodiment may be acquired from an external device via a communication line connected to the communication I/F.

The disclosure of Japanese Patent Application No. 2021-023748 filed on Feb. 17, 2021 is incorporated herein by reference in its entirety. All documents, patent applications, and technical standards described in this specification are incorporated herein by reference to the same extent as if each document, patent application, and technical standard were specifically and individually indicated to be incorporated by reference.

The invention claimed is:

1. An information processing device comprising:
a processor,
wherein the processor is configured to:
receive settings of a job that is a process in which the information processing device executes a function,
in a case in which the job is executed by using the received settings, display an operator associated with the settings of the executed job on a display unit in a case in which an operation is continuously performed by an unauthenticated user who is a user who is not authenticated, and not display the operator in a case in which the operation is not continuously performed by the unauthenticated user,
in a case in which setting information that is information regarding the settings includes destination information that is information regarding a destination and the job is executed by using the setting information, store the setting information,
in a case in which the operator is not displayed and the destination information is input, specify the setting information related to the input destination information from the stored setting information, and
display the operator associated with the settings related to the specified setting information.

2. The information processing device according to claim 1, wherein the processor is further configured to:
in a case in which the destination information is not included in the setting information, display the operator associated with the settings of the executed job regardless of whether or not the operation is performed by the unauthenticated user.

3. The information processing device according to claim 1, wherein the processor is further configured to:
determine that the operation is continuously performed by the unauthenticated user in a case in which at least one condition of a case in which a material used to execute the job remains in the information processing device, a case in which the unauthenticated user is not away from the own device, or a case in which the operation is performed within a predetermined period is satisfied.

4. An information processing device comprising a processor configured to:
receive settings of a job that is a process in which the information processing device executes a function,
in a case in which the job is executed by using the received settings, display an operator associated with the settings of the executed job on a display unit in a case in which an operation is continuously performed by an unauthenticated user who is a user who is not authenticated, and not display the operator in a case in which the operation is not continuously performed by the unauthenticated user,
determine that the operation is continuously performed by the unauthenticated user in a case in which at least one condition of a case in which a material used to execute the job remains in the information processing device, a case in which the unauthenticated user is not away from the own device, or a case in which the operation is performed within a predetermined period is satisfied,
preset priorities for respective conditions of the case in which a material used to execute the job remains in the own device, the case in which the unauthenticated user is not away from the information processing device, and the case in which an operation is performed within a predetermined period, and
determine whether or not an operation is continued by the unauthenticated user according to propriety of a condition with a high priority.

5. The information processing device according to claim 1, wherein the processor is further configured to:
in a case in which it is determined that the operation is not continuously performed by the unauthenticated user, notify that the operator is not displayed.

6. The information processing device according to claim 1, wherein the processor is further configured to:
in a case in which the operator is selected, apply the settings associated with the operator to the job and receive an instruction to immediately execute the job or an instruction to change the settings applied to the job.

7. A non-transitory computer-readable storage medium storing an information processing program that is executable by a computer to:
receive settings of a job that is a process in which an information processing device executes a function;
in a case in which the job is executed by using the received settings, display an operator associated with the settings of the executed job on a display unit in a case in which an operation is continuously performed by an unauthenticated user who is a user who is not authenticated, and not display the operator in a case in which the operation is not continuously performed by the unauthenticated user;
in a case in which setting information that is information regarding the settings includes destination information that is information regarding a destination and the job is executed by using the setting information, store the setting information;
in a case in which the operator is not displayed and the destination information is input, specify the setting information related to the input destination information from the stored setting information; and
display the operator associated with the settings related to the specified setting information.

8. A non-transitory computer-readable storage medium storing an information processing program that is executable by a computer to:

receive settings of a job that is a process in which an information processing device executes a function;

in a case in which the job is executed by using the received settings, display an operator associated with the settings of the executed job on a display unit in a case in which an operation is continuously performed by an unauthenticated user who is a user who is not authenticated, and not display the operator in a case in which the operation is not continuously performed by the unauthenticated user;

determine that the operation is continuously performed by the unauthenticated user in a case in which at least one condition of a case in which a material used to execute the job remains in the information processing device, a case in which the unauthenticated user is not away from the own device, or a case in which the operation is performed within a predetermined period is satisfied;

preset priorities for respective conditions of the case in which a material used to execute the job remains in the own device, the case in which the unauthenticated user is not away from the information processing device, and the case in which an operation is performed within a predetermined period; and determine whether or not an operation is continued by the unauthenticated user according to propriety of a condition with a high priority.

* * * * *